H. M. BRIGHTMAN.
APPARATUS FOR FINISHING CYLINDRICAL BARS AND SHAFTINGS.
APPLICATION FILED OCT. 23, 1920.

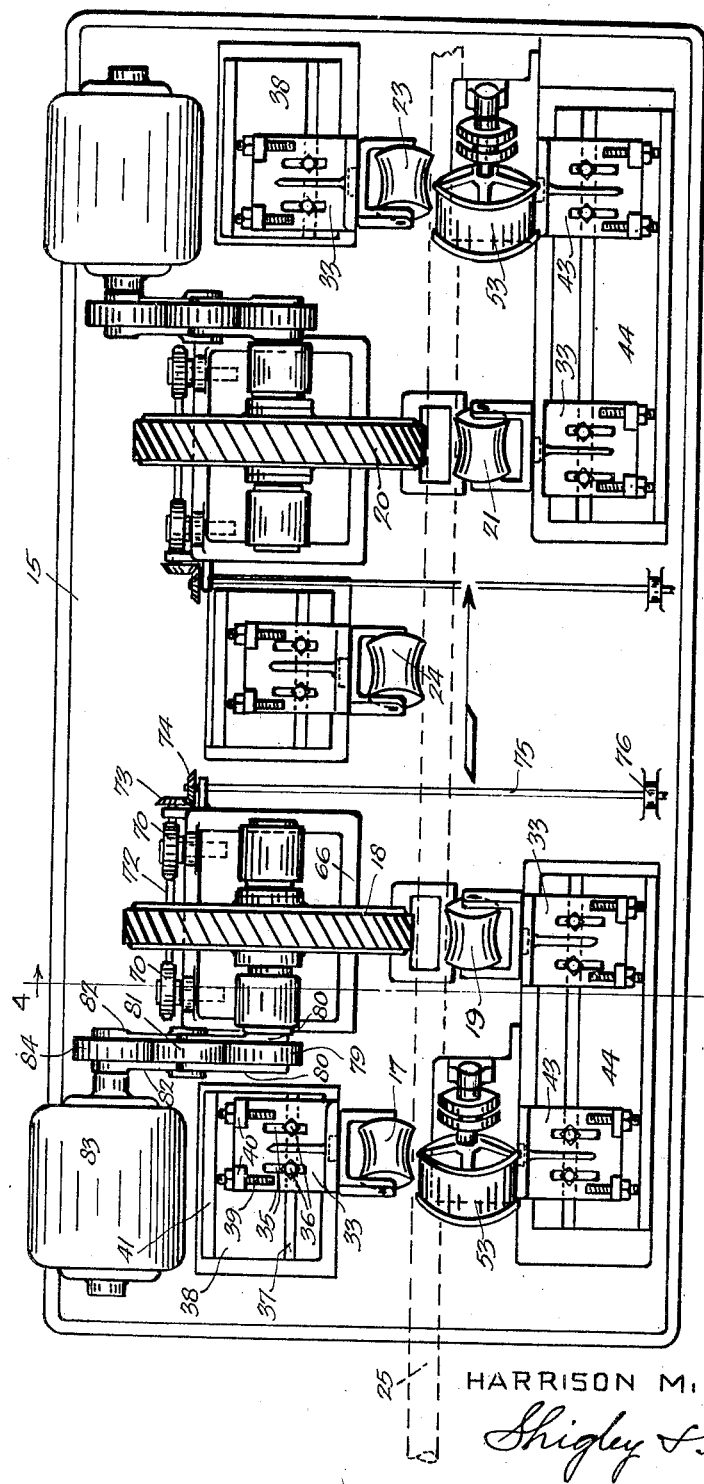

1,411,474.

Patented Apr. 4, 1922.

3 SHEETS—SHEET 2.

INVENTOR.

HARRISON M. BRIGHTMAN

BY

*Shigley & Harney*

ATTORNEYS

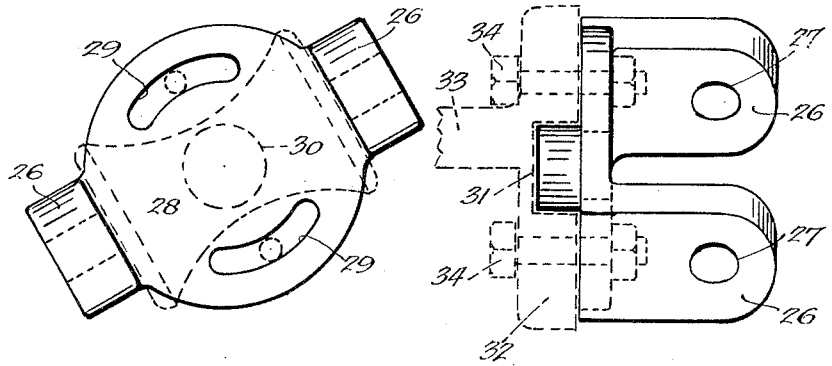
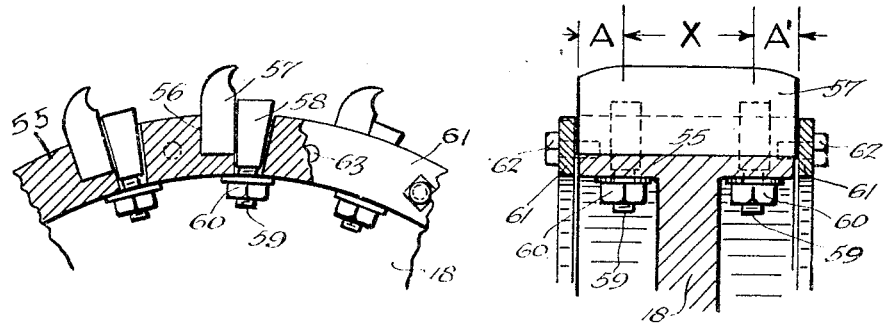
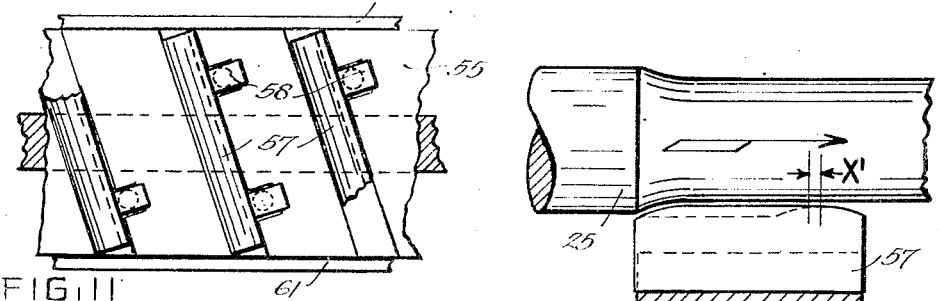
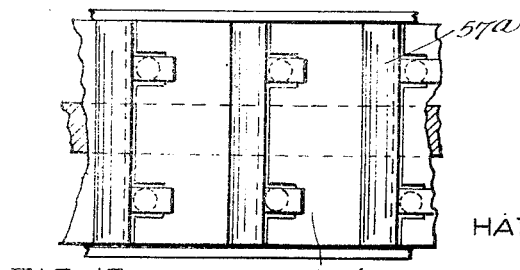

UNITED STATES PATENT OFFICE.

HARRISON M. BRIGHTMAN, OF COLUMBUS, OHIO, ASSIGNOR OF ONE-FOURTH TO G. F. BRIGHTMAN, ONE-FOURTH TO H. L. BRIGHTMAN, AND ONE-FOURTH TO J. H. BRIGHTMAN, ALL OF COLUMBUS, OHIO.

APPARATUS FOR FINISHING CYLINDRICAL BARS AND SHAFTINGS.

1,411,474.        Specification of Letters Patent.        Patented Apr. 4, 1922.

Application filed October 23, 1920. Serial No. 418,931.

*To all whom it may concern:*

Be it known that I, HARRISON M. BRIGHTMAN, a citizen of the United States of America, residing at Columbus, in the county of Franklin and State of Ohio, have invented certain new and useful Improvements in Apparatus for Finishing Cylindrical Bars and Shaftings, of which the following is a specification.

My present invention relates generally to apparatus for finishing cylindrical bars and shafting, and is more particularly a turning machine embodying feeding, guiding and cutting means utilizable in turning bars or billets and for finishing steel bars, shafting and the like, my object being the provision of a machine or apparatus by which to rough turn and reduce superficial checks of alloy steel bars much more efficiently and with much more speed than is accomplished by present methods and machines.

In carrying out my invention I employ one or more motor driven independently adjustable feed rolls and one or more independently adjustable cutter wheels, the functions of the feed rolls being to impart both lengthwise movement and rotation to the work and the functions of the cutter being to reduce surface checks and turn to a true surface the bars, billets, shafting or the like being operated upon. Both the feed rolls and the cutter wheels which may be included in a series of any suitable number depending upon the work in hand, operate in connection with independently adjustable guide rollers of an idle nature, and are such that proper movement is imparted to the work and its surface reduction accomplished with a minimum expenditure of power and results embodying a maximum of efficiency, the cutter wheels operating at high speed without danger of overheating and with a minimum of breakage and wide range as to the depth of the cut.

Figure 3:
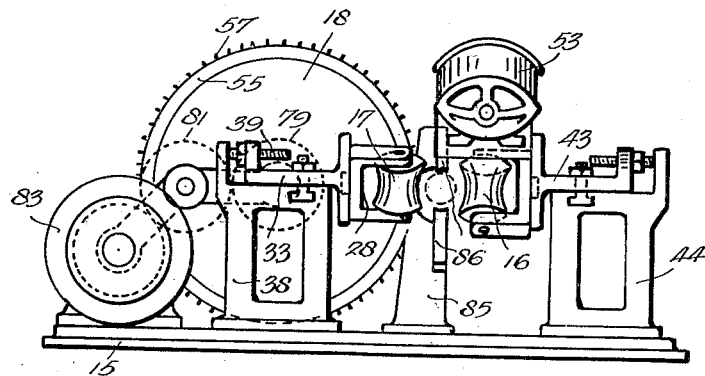
Figure 4:
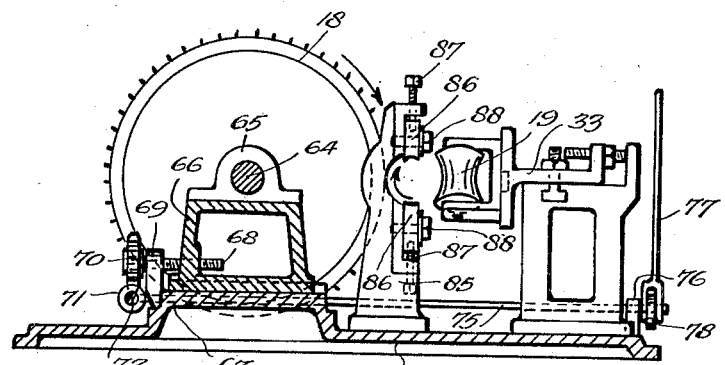
Figures 5, 6:
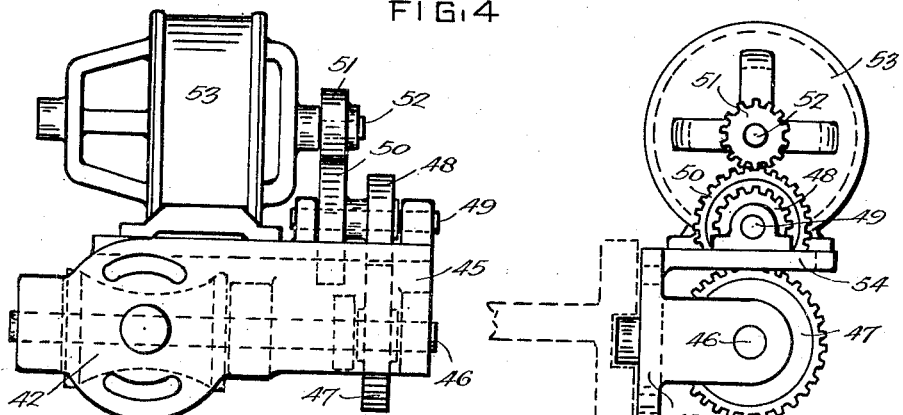

In the accompanying drawings which illustrate my present invention and form a part of this specification, Figure 1 is a general plan view of the assembled parts constituting my improved machine, Figure 2 is a diagrammatic side view of the work engaging parts of the machine, Figure 3 is an end view, Figure 4 is a cross section taken on line 4—4 of Figure 1, Figure 5 is a front elevation of one of the feed rollers, its frame and driving connection, Figure 6 is a side view thereof, Figure 7 is a front elevation of one of the guide roller frames, Figure 8 is a top plan view thereof in connection with a portion of its support, Figure 9 is a side view of a portion of one of the cutter wheels, partly broken away and in section, Figure 10 is a radial section through a portion thereof, Figure 11 is a partial plan view, Figure 12 is a partial plan view illustrating a slightly modified form of construction, and Figure 13 is a partial radial section illustrating the application of the cutter in use.

Referring now to these figures and particularly to Figure 1, I have shown my improved apparatus as including a base or main support 15 on which I have shown at lengthwise spaced points a series of work engaging elements more plainly to be seen from the diagram of Figure 2 and including from one end to the other of the support a feed roll 16 opposing a guide roller 17; a cutter wheel 18 opposing a guide roller 19, a second cutter wheel 20 opposing a guide roller 21 and finally a second feed roller 22 opposing a guide roller 23, with or without the use of a single guide roller 24 between the lengthwise spaced cutter wheels 18 and 20.

The several guide rollers 17, 23 and 24 are idle in the sense that they are not driven, and like the feed roller 16 and 22, driven in a manner to be presently described, are hyperboloidal rollers, disposed with their axes at angles to the axially movable plane of the work in hand which as above stated may be of various forms, for instance shafting 25 as seen in Figure 13.

For the purpose of adjustably supporting the several guide rollers, each is mounted by means of axially projecting trunnions or a shaft, through the outstanding bearing ears 26 having apertures 27 as seen in Figure 8 of a frame plate 28 of generally circular form provided with arcuate slots 29 at diametrically opposite sides and with a centrally located outwardly projecting boss 30. The boss 30 enters the boss receiving recess 31 of a head 32 of a bracket 33, head 32 having bolts 34 which are extended through the frame plate slots 29 so as to adjustably connect the guide roller frame in order to support the guide roller in properly angular axial relation to the work. Each guide roller bracket 33 has slots 35 at right angles to the vertical plane of the guide roller, and through these slots project the upper ends of adjusting bolts 36 having their lower headed ends movably disposed in undercut slots 37 of the upper supporting surface of a bracket holding upright 38, the slot 37 of which parallels the plane of the work as shown in Figure 1. Thus each bracket 33 may be shifted, by virtue of the movement of bolts 36 in the slot 37, in a direction parallel to the work, and by virture of the movement of bolts 36 in the slots 35 of the bracket, may also be shifted in a plane transverse to the work and more or less engage the guide roller with the work. These two adjustments are locked at the same time by tightening the bolts 36 and the last mentioned adjustment, that is movement of the bracket 33 toward and away from the work is preferably controlled by adjusting screws 39 threaded through upstanding bearings 40 of the bracket and engaging an upright flange 41 of the support 38.

Each of the feed rollers 16 and 22 opposing the guide rollers 17 and 23, is similarly mounted in connection with a bossed arcuately slotted frame 42 seen in Figures 5 and 6 and each frame 42 is adjustable similarly to the guide roller frames 28, upon a bracket 43 which has similar means of adjustment to the before mentioned guide roller brackets 33, upon a supporting upright 44 which also supports the bracket 33 of one of the guide rollers opposing one of the cutter wheels 18 and 20. Each of the feed roller supporting frames 42 has however an extended portion 45 and an extended shaft 46 which latter, within the extended portion of the frame has a gear 47 engaging a gear 48 mounted upon a countershaft 49 supported upon the extended portion 45 of the frame and rigidly in connection with a gear 50, the latter engaged by a gear 51 upon the shaft 52 of a motor 53. The motor 53 is mounted upon an upper angular portion 54 of the frame 42 and it will be noted from Figures 5 and 6 that the gears 47 and 48 as well as gears 50 and 51 are so proportioned that the speed of the motor 53 is materially reduced in the transmission of movement therefrom to the feed roller 16, 22.

Each of the cutter wheels 18 and 20 has an annular rim 55 as seen in Figures 9 to 13 inclusive, provided with transverse surface grooves 56 for the reception of cutters 57 disposed in a circumferential series around the cutter wheel either at a right angle to the axis of the cutter wheel and thus parallel to the shafting 25 or other work, or at an angle to its axis inclined with respect to the axis of the work, the right angular position being shown in connection with the cutters 57ª of the cutter wheel rim 55ª in Figure 12, and the inclined angular position, which is preferred, being shown in the other figures.

In either the right angular or inclined angular positions, the cutters are held by virtue of wedge blocks 58 extending through tapering radial openings of the cutter wheel rims and having inner threaded stems 59 for the reception of clamping nuts 60 at the inner surface of the rim, and the rim of the cutter wheel in each instance is also provided with detachably bolted side rings 61 as best seen in Figure 10 whose function is to prevent lengthwise shifting movement of the cutters 57, the bolts 62 of these rings extending into side openings 63 of the cutter wheel rim as seen by a comparison of Figures 9 and 10.

Each cutter wheel is mounted upon a shaft 64, see Figure 4, supported at opposite sides of the wheel in bearings 65 of a stand 66, the latter having guided movement upon a raised portion 67 of the base 15 in a direction at right angles to the line of the work so that by adjustment of the stand the cutter wheel may be shifted toward and away from the work and the depth of cut of the cutters 57 effectively controlled. For this purpose lengthwise immovable adjusting screws 68 are threaded into the rear portions of each cutter wheel stand 66, each adjusting screw being mounted in a bearing 69 and having a worm wheel 70 engaged by a worm 71 of an adjusting shaft 72. At one end of each adjusting shaft 72 is a bevel gear 73 engaged by a bevel gear 74 at the rear end of a forwardly projecting controlling shaft 75, the latter extending forwardly across the supporting base 15 at a point materially below the horizontal plane of the work and having its forward end extending through a bearing 76 of the said support 15 and provided at the front of the machine with an upright controlling handle 77 connected thereto by any suitable form of double ratchet at 78.

Each cutter wheel shaft 64 is moreover provided at one side of the cutter wheel and its stand 66, with a gear 79 and is also engaged by the forward ends of links 80 at opposite sides of gear 79. Gear 79 is engaged by an intermediate gear 81 whose projecting shaft is movably engaged by the rear ends of the links 80 and the forward ends of side links 82, connecting the shaft of the gear 81 with the shaft of a motor 83. This motor 83 is mounted directly upon the base 15 as seen in Figure 3 and its shaft has a gear 84 engaging the intermediate gear 81 through which it transmits rotation to the gear 79 of the cutter wheel shaft 64. The link connection between the motor shaft and the cutter wheel shaft is such that the cutter wheel may be shifted toward and away from the work with its stand 66 and without affecting proper relative engagement of the cutter wheel driving gears 79, 81 and 84.

The idle guide roller 24 where one is used between the two cutter wheels, is supported in the same manner as the guide rollers 17, 19, 21 and 23, opposing the feed rollers and the cutter wheels, and while I have shown in the assembled machine of Figure 1 an arrangement including two feed rollers and two cutter wheels, one of the latter of which may be utilized to take a first and rough cut and the other a finer or finishing cut, it is to be understood that I may utilize but a single feed roller and a single cutter wheel or for some classes of work I may still further extend the apparatus and employ other feed rollers and other cutter wheels in number beyond those herein described.

It is also to be understood from reference to Figure 3 that by virtue of the similar sizes of the cutter wheel driving gears 79, 81 and 84, the cutter wheels 18 and 20 will be driven without reduction of speed from their motors 83 and will thus have a peripheral speed greatly exceeding that of the work engaging feed rollers 16 and 22. The fact however that the cutter wheels are each in engagement at but a single point of their peripheries with the work precludes overheating as between each engagement with the work, each of the cutters 57 is subjected to the cooling action of the air throughout a complete rotation of the cutter wheel.

In addition to the foregoing I preferably mount an upright 85 having portions at opposite sides of the front of each of the cutter wheels 18 and 20 and having above and below the line of the work vertically adjustable work supporting blocks 86 whose inner concave surfaces may be adjusted into engagement with the work above and below the axis of the work by adjusting screws 87 and may be locked in such position by clamping bolts 88, in order to counteract any tendency of the work to raise and lower under the cutting action.

In operation with the work properly engaged by the adjusted feed rollers 16 and 22 and the adjusted guide rollers 17, 19, 21 and 23 as well as the guide roller 24 if the latter is used, and disposed in the position shown in dotted lines in Figure 1, starting of the feed roller actuating motors 53 causes rotation of the feed rollers and movement of the work both in the direction of its longitudinal axis and in rotation. Upon starting of the cutter wheel actuating motors 83, the cutter wheels are rotated and as before stated at a much greater speed of rotation than that of the feed rollers, and the operator stationed at the front of the machine can through manipulation of the controlling levers 77 adjust the cutter wheels into proper or desired cutting relation with the work, one for instance to take an initial rough cut and the other a finer finishing cut. The rotation is moreover imparted in practice to the cutter wheels in a direction opposite to that of rotation of the work as indicated by the arrows in Figure 4, lengthwise movement of the work following the direction of the arrows in Figure 1, so that the cut is made against rotation of the work, although the parts render reversal quite ready and easy of accomplishment.

It is contemplated that any desired speed may be given the cutter wheel dependent for instance upon the material to be worked and that the cutters themselves, either parallel with the work or angular with respect thereto, may have edges either straight from side to side or partly curved. The cutters have partly curved edges, as shown in Figures 10 and 13, that is curved at the cutter sides between the lines at the points marked A and A' and substantially straight between these points as at X, so that the work will be given an initial rough cut and during the life of the cutter the straight portion will remain to effectively accomplish the final finishing cut as the part A gradually widens by virtue of its exposure to greatest wear. This is well illustrated in Figure 13 where the part A is shown by dotted lines in an advanced stage of wear, leaving only a small part X' of the original straight edge, but still enough to properly finish the work.

It is also contemplated as a possibility at least that the cutter wheels may rotate at an angle other than a true right angle with respect to the work, using cutting blades which are either right angular or at angles other than a right angle with respect to the cutter wheels.

I claim:

1. In an apparatus for turning elongated cylindrical work, work feeding means including a pair of hyperboloidal rollers, a frame in which each of said rollers is mounted, a bracket in which each frame has a pivot and an adjustable connection around the pivot, a support, means adjustably connecting the bracket on the support for shifting movement toward and away from, and parallel to, the work, and a motor mounted directly on the frame of one of the rollers and geared thereto for driving the same.

2. In an apparatus for turning elongated cylindrical work, means for feeding the work in the direction of its length and rotating the same, and a cutter including a cutter wheel having peripheral cutting blades and rotating at right angles to the work, a manually shiftable support on which said cutter wheel is mounted for movement toward and away from the work, and means for rotating the cutter wheel, having a geared connection therewith.

3. In an apparatus for turning elongated cylindrical work, means for feeding the work in the direction of its length and rotating the same, and a cutter including a cutter wheel having peripheral cutting blades and rotating at right angles to the work, a manually shiftable support on which said cutter wheel is mounted for movement toward and away from the work, a base on which the support is adjustable, a motor on the base, and flexible gearing connections between the motor and the cutter wheel including gear carrying links permitting adjustment of the cutter wheel with respect to the motor.

4. An apparatus for turning elongated cylindrical articles including a feed roller, a cutter wheel, guide rollers opposing the fed roller and the cutter wheel, means for driving the feed roller to shift the work lengthwise and rotate the same, and means to drive the cutter wheel against the work.

5. An apparatus for turning elongated cylindrical work including peripherally dished article engaging rollers, means for driving the same to simultaneously shift the work lengthwise and rotate the same, and a peripherally active cutter wheel rotating in a plane at right angles to the line of shifting movement of the work.

6. An apparatus for turning elongated cylindrical work including hyperboloidal rollers engaging and supporting the work, means for driving certain of said rollers to shift the work lengthwise and rotate the same, and a peripherally active cutter wheel rotating in a plane at right angles to the work and shiftable toward and away from the same.

7. An apparatus for turning elongated cylindrical work including hyperboloidal rollers engaging and supporting the work, means for driving certain of said rollers to shift the work lengthwise and rotate the same, a peripherally active cutter wheel disposed at right angles to the line of shifting movement of the work and adjustable toward and away from the same, and means for rotating the cutter wheel in a direction opposite to that of the rotating work and at a relatively greater speed as described.

In testimony whereof I have affixed my signature.

HARRISON M. BRIGHTMAN.